(12) United States Patent
Schwarz et al.

(10) Patent No.: US 10,830,153 B2
(45) Date of Patent: *Nov. 10, 2020

(54) GEARED TURBOFAN ENGINE WITH POWER DENSITY RANGE

(71) Applicant: RAYTHEON TECHNOLOGIES CORPORATION, Farmington, CT (US)

(72) Inventors: Frederick M. Schwarz, Glastonbury, CT (US); Daniel Bernard Kupratis, Wallingford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 381 days.

This patent is subject to a terminal disclaimer.

(21) Appl. No.: 16/186,811

(22) Filed: Nov. 12, 2018

(65) Prior Publication Data

US 2019/0153960 A1        May 23, 2019

Related U.S. Application Data

(63) Continuation of application No. 14/593,056, filed on Jan. 9, 2015, now Pat. No. 10,125,693, which is a
(Continued)

(51) Int. Cl.
*F02C 7/36*        (2006.01)
*F02C 3/107*        (2006.01)
(Continued)

(52) U.S. Cl.
CPC ............... *F02C 7/36* (2013.01); *F01D 1/26* (2013.01); *F01D 15/12* (2013.01); *F02C 3/107* (2013.01);
(Continued)

(58) Field of Classification Search
CPC ............... F02C 7/36; F01D 15/12; F02K 3/06
See application file for complete search history.

(56) References Cited

U.S. PATENT DOCUMENTS 2,258,792 A    4/1941 New
2,936,655 A    5/1960 Peterson et al.
(Continued)

FOREIGN PATENT DOCUMENTS

EP        0791383        8/1997
EP        1142850        10/2001
(Continued)

OTHER PUBLICATIONS

Response to Statement of Grounds of Appeal from the Patent Holder for European Patent No. 2809931 by Safran Aircraft Engine dated Aug. 21, 2019.
(Continued)

*Primary Examiner* — Justin D Seabe
(74) *Attorney, Agent, or Firm* — Carlson, Gaskey & Olds, P.C.

(57) ABSTRACT

A gas turbine engine turbine has a compressor section including a low pressure compressor and a high pressure compressor, a turbine section including a low pressure turbine and a high pressure turbine, the high pressure turbine rotatable with the high pressure compressor as a high pressure spool in a first direction about an engine longitudinal axis, the low pressure turbine rotatable as a low pressure spool in the first direction about the engine longitudinal axis, a power density of greater than or equal to 4.75 and less than or equal to 5.5 lbf/in³, a fan section including a fan having a plurality of fan blades, the fan connected to the low pressure spool via a geared architecture such that the
(Continued)

fan is rotatable about the engine longitudinal axis in a second direction opposed to the first direction, and a bypass ratio greater than 6.

32 Claims, 4 Drawing Sheets

Related U.S. Application Data continuation-in-part of application No. 13/446,312, filed on Apr. 13, 2012, now abandoned.

(60) Provisional application No. 61/619,111, filed on Apr. 2, 2012.

(51) Int. Cl.
| | | |
|---|---|---|
| *F02K 3/06* | (2006.01) | |
| *F01D 1/26* | (2006.01) | |
| *F01D 15/12* | (2006.01) | |

(52) U.S. Cl.
CPC ...... *F02K 3/06* (2013.01); *F05D 2260/40311* (2013.01); *F05D 2270/051* (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,250,512 A | 5/1966 | Petrie |
| 3,287,906 A | 11/1966 | McCormick |
| 3,352,178 A | 11/1967 | Lindgren et al. |
| 3,412,560 A | 11/1968 | Gaubatz |
| 3,526,092 A | 9/1970 | Steel |
| 3,527,054 A | 9/1970 | Hemsworth |
| 3,664,612 A | 5/1972 | Skidmore et al. |
| 3,747,343 A | 7/1973 | Rosen |
| 3,754,484 A | 8/1973 | Roberts |
| 3,820,719 A | 6/1974 | Clark |
| 3,861,139 A | 1/1975 | Jones |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,284,174 A | 8/1981 | Salvana et al. |
| 4,289,360 A | 9/1981 | Zirin |
| 4,304,522 A | 12/1981 | Newland |
| 4,478,551 A | 10/1984 | Honeycutt, Jr. et al. |
| 4,649,114 A | 3/1987 | Miltenburger et al. |
| 4,693,616 A | 9/1987 | Rohra |
| 4,696,156 A | 9/1987 | Burr et al. |
| 4,827,712 A | 5/1989 | Coplin |
| 4,979,362 A | 12/1990 | Vershure, Jr. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,709,492 B1 | 3/2004 | Spadaccini et al. |
| 6,732,502 B2 | 5/2004 | Seda et al. |
| 6,814,541 B2 | 11/2004 | Evans et al. |
| 6,883,303 B1 | 4/2005 | Seda |
| 7,021,042 B2 | 4/2006 | Law |
| 7,219,490 B2 | 1/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,600,370 B2 | 10/2009 | Dawson |
| 7,632,064 B2 | 12/2009 | Somanath |
| 7,662,059 B2 | 2/2010 | McCune |
| 7,694,505 B2 | 4/2010 | Schilling |
| 7,806,651 B2 | 10/2010 | Kennepohl et al. |
| 7,824,305 B2 | 11/2010 | Duong et al. |
| 7,828,682 B2 | 11/2010 | Smook |
| 7,882,693 B2 | 2/2011 | Schilling |
| 7,926,260 B2 | 4/2011 | Sheridan et al. |
| 7,997,868 B1 | 8/2011 | Liang et al. |
| 8,015,798 B2 | 9/2011 | Norris et al. |
| 8,061,969 B2 | 11/2011 | Durocher et al. |
| 8,091,371 B2 | 1/2012 | Durocher et al. |
| 8,205,432 B2 | 6/2012 | Sheridan |
| 2006/0228206 A1 | 10/2006 | Decker et al. |
| 2007/0265133 A1 | 11/2007 | Smook |
| 2008/0003096 A1 | 1/2008 | Kohli et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0081237 A1 | 4/2011 | Durocher et al. |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2013/0186058 A1 | 7/2013 | Sheridan et al. |
| 2013/0255219 A1 | 10/2013 | Schwarz et al. |
| 2013/0259653 A1 | 10/2013 | Schwarz et al. |
| 2013/0287575 A1 | 10/2013 | McCune et al. |

FOREIGN PATENT DOCUMENTS

| | | |
|---|---|---|
| EP | 1703085 | 9/2006 |
| EP | 2192269 A2 | 6/2010 |
| EP | 2532841 | 12/2012 |
| EP | 2532858 | 12/2012 |
| EP | 2551489 | 1/2013 |
| EP | 2809931 | 7/2016 |
| FR | 2563865 | 11/1985 |
| FR | 2912181 | 8/2008 |
| GB | 1516041 | 6/1978 |
| GB | 2041090 | 9/1980 |
| GB | 2426792 | 12/2006 |
| WO | 2007038674 | 4/2007 |
| WO | 2013116262 | 8/2013 |
| WO | 2014047040 | 3/2014 |
| WO | 2015/031143 A1 | 3/2015 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

(56) References Cited

OTHER PUBLICATIONS

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K, Gu, C., and Hui, D. (2005). A critical review on nanotube and nanotube/nanoclay related polymer composite materials. Composites: Part B 37(2006) 425-436.

Shorter Oxford English dictionary, fith Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-151.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

(56) References Cited

OTHER PUBLICATIONS

Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.N. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a sigh specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal sparlsuperhybrid shell composite fan blades. Prepared for NASA. NASA-CR-159594. Aug. 1979. pp. 1-127.
"Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.

(56) References Cited

OTHER PUBLICATIONS

NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.

Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-neating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L/, Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.

(56) References Cited

OTHER PUBLICATIONS

Bunker, R.S. (2005). A review of shaped hole turbine film-cooling technology. Journal of Heat Transfer vol. 127. Apr. 2005. pp. 441-453.
Request for Opinion as to Validity of European Patent No. 2809922B1 Observations-in-Reply mailed Apr. 3, 2019 by Rolls-Royce.
Opinion under Section 74(a) for European Patent Application No. 2809922 mailed May 9, 2019.
Statement of Appeal filed Mar. 22, 2019 by Safran in European Patent 2809931.
Request for Opinion as to Validity for European Patent No. 2809922 by Rolls Royce dated Feb. 6, 2019.
Annotation of Edkins, D.P., Hirschkron, R., and Lee, R. (1972). TF34 turbofan quiet engine study. Final Report prepared for NASA. NASA-CR-120914. Jan. 1, 1972. p. 92.
Annotation of Gray, D.E. (1978). Energy efficient engine preliminary design and integration studies. Prepared for NASA. NASA CR-135396. Nov. 1978. p. 70.
Decision Institution of Inter Partes Review. *General Electric Company.*, Petitioner, v. *United Technologies Corp.*, Patent Owner. IPR2018-01442. U.S. Pat. No. 9,695,751. Entered Feb. 21, 2019. pp. 1-25.
Gray, D.E. and Gardner, W.B. (1983). Energy efficient engine program technology benefit/cost study—vol. 2. NASA CR-174766. Oct. 1983. pp. 1-118.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.

MacIsaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-712.
AGMA Standard (1999). Flexible couplings—Mass elastic properties and other characteristics. Alexandria, VA: American Gear Manufacturers Association. pp. 1-46.
Wikipedia. Stiffness. Retreived Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report Prepared for NASA. NASA-CP-134847. Retreived from: https://ntrs.nasa.gov/archive/nasa/casi.ntrs.nasa.gov/19800075257.pdf.
Notice of Opposition of European Patent No. 2949881 mailed May 28, 2019 by Safran Aircraft Engines.
Notice of Opposition of European Patent No. 2949881 mailed May 287, 2019 by Rolls-Royce.
Summons to Attend Oral Proceedings for European Patent Application No. 13743283.7 dated May 28, 2019.
Roux, E. (2007). Turbofan and turbojet engines database handbook. Editions Elodie Roux. Blagnac: France. pp. 41-42, p. 465, p. 468-469.
Fowler, T.W. Ed. (1989). Jet engines and propulsion systems for engineers. GE Aircraft Engines. Training and Educational Development and the University of Cincinnati for Human Resource Development. pp. 1-516.
Fanchon, J-L. (1994). Guide de sciences et technologies industrielles. Paris, France: Nathan, AFNOR. pp. 359-360.
Le Borzec, R. (1992). Reducteurs de vitesse a engrenages. Techniques de l'Igenieur. Nov. 10, 1992. pp. 1-36.

(56) References Cited

OTHER PUBLICATIONS

International Preliminary Report on Patentability for PCT Application No. PCT/US/2013/034518 dated Oct. 16, 2014.
Diagram of prior art V2500 and PW4090 engines.
NASA. Engine weight model. Glenn Research Center. Retrieved Mar. 11, 2016 from: http://www.grc.nasa.gov/WWW/K-12/airplane/turbwt.html.
Supplementary European Search Report for European Application No. 13837107.5 dated Jan. 28, 2016.
European Search Report for European Application No. 16150651.4 dated May 24, 2016.
English translation of Measurement and calculation methodology on TFE731-2, TFE731-3A and TFE731-3D models Notice of Opposition o European Patent No. EP2811120. United Technologies Corporation opposed by Safran Aircraft Engines. Mailed Apr. 12, 2018.
English translation of expert certificate concerning the technical nature of the drawings used in the measurement and calculation methodology cited in Notice of Opposition o European Patent No. EP2811120. United Technologies Corporation opposed by Safran Aircraft Engines. Mailed Apr. 12, 2018.
Declaration of Raymond Drago. In re U.S. Pat. No. 8,297,916. IPR2018-01172. Executed May 29, 2018. pp. 1-115.
Declaration of Courtney H. Bailey. In re U.S. Pat. No. 8,511,605. Executed Jul. 19, 2016. pp. 1-4.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
Notice of Opposition to European Patent No. EP2949882. United Technologies Corporation opposed by Rolls Royce. Mailed May 22, 2018.
Notice of Opposition to European Patent No. EP2811120. United Technologies Corporation opposed by Rolls Royce. Mailed Apr. 12, 2018.
Notice of Opposition and English Translation to European Patent No. EP2811120. United Technologies Corporation opposed by Safran Aircraft Engines. Mailed Apr. 12, 2018.
Notice of Opposition and English Translation to European Patent No. EP299882. United Technologies Corporation opposed by Safran Aircraft Engines. Mailed May 23, 2018.
Petition for Inter Partes Review of U.S. Pat. No. 9,695,751. *General Electric Company*, Petitioner, v. *United Technologies Corporation*, Patent Owner. IPR2018-01442. Filed Jul. 24, 2018.
International Search Report & Written Opinion for International Application No. PCT/US2013/034518 datd Nov. 22, 2013.
Decision of the Opposition Division for European Patent No. 2811120 mailed Jan. 15, 2020.
Third Party Observations of European Patent Application No. 18191325.2 mailed Mar. 10, 2020 by Rolls Royce.
Third Party Observations of European Patent Application No. 18191325.2 mailed Mar. 6, 2020 by Rolls Royce.
Third Party Observations of European Patent Application No. 18191333.6 mailed Mar. 9, 2020 by Rolls Royce.
Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.
(1987). Wide-chord fan—12 years of development. Aircraft Engineering and Aerospace Technology. vol. 59, issue 7. pp. 10-11. Retrieved Jul. 31, 2008 from: https://doi.org/10.1108/eb036471.
Notice of Opposition of European Patent No. 2834469 mailed Mar. 27, 2019 by Safran Aircraft Engines.
Rolls-Royce Trent 900. Jane's Aero-Engines. Jane's by IHS Markit. Feb. 8, 2012.
Rolls-Royce Trent XWB. Jane's Aero-Engines. Jane's by IHS Markit. Mar. 6, 2012.
The jet engine. Rolls-Royce plc. 5th Edition. 1996. pp. 48.

Gas turbine technology: Introduction to a jet engine. Rolls-Royce plc. Dec. 2007.
Bradley, A. (2010). Presentation: Engine design for the environment. Rolls-Royce. RAeS-Hamburg. Jun. 24, 2010.
Praisner, T.J., Grover, E., Mocanu, R., Jurek, R., and Gacek, R. (2010). Predictions of unsteady interactions between closely coupled HP and LP turbines with co-and counter-rotation. Proceedings of ASME Turbo Expo 2010. Jun. 14-18, 2018. Glasgow, UK. p. 1-10.
Response to Holder's Response. European Patent No. 2949882 mailed Mar. 12, 2019 by Safran Aircraft Engines.
Decision of the Opposition Division. European Patent No. 2949882 mailed Nov. 26, 2018.
Annexe Mesures—Methodologie de mesure et de calcul.
Third Party Observations of European Patent Application No. 14155460.0 (European Patent Application No. 2811120) mailed Oct. 29, 2018 by Rolls Royce.
Attestation of Philippe Pellier signed Apr. 12, 2017.
Attestation of Didier Escure signed Sep. 17, 2018.
Holder's Response to Written Opinion dated Sep. 29, 2015. European Patent Application No. 15175205.2 mailed Jun. 1, 2016.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-733, 802-805, 828-830, 862-864, and 923-927.
Brief Communication from Opponent after Oral Proceedings for European Patent Application No. 13743283.7 by Safran Aircraft Engines dated Dec. 2, 2019.
Third Party Observations for European Patent Application No. 13777804.9 by Rolls-Royce dated Nov. 21, 2019.
Summons to Attend Oral Proceedings for European Patent Application No. 13778330.4 dated Dec. 2, 2019.
Summons to Attend Oral Proceedings for European Patent Application No. 13777804.9 dated Dec. 10, 2019.
Response to the Summons of Oral Proceedings for European Patent No. 3051078 by Rolls-Royce dated Oct. 17, 2019.
Response to the Summons of Oral Proceedings for European Patent No. 2949882 by Rolls-Royce dated Oct. 9, 2019.
Response to the Summons of Oral Proceedings for European Patent No. 2949882 by Safran dated Oct. 9, 2019.
Final Written Decision. *General Electric Company.*, Petitioner, v. *United Technologies Corp.*, Patent Owner. IPR2018-01442. U.S. Pat. No. 9,695,751. Entered Feb. 20, 2020. pp. 1-72.
Notice of Opposition for European Patent No. 2809931 mailed Apr. 20, 2017 by Safran Aircraft Engines.
Notice of Opposition for European Patent No. 2809939 mailed Sep. 24, 2018 by Safran Aircraft Engines.
Notice of Opposition for European Patent No. 2809939 mailed Sep. 26, 2018 by Rolls-Royce.
Notice of Opposition for European Patent No. 2809932 mailed Sep. 20, 2018 by Safran Aircraft Engines.
Notice of Opposition for European Patent No. 2809922 mailed Mar. 18, 2019 by Rolls-Royce plc.
Notice of Opposition for European Patent No. 2809922 mailed Mar. 20, 2019 by Safran Aircraft Engines.
Third Party Observations and Concise Description of Relevance of Document for U.S. Appl. No. 15/881,240 mailed Aug. 31, 2018.
Honeywell TFE731-5AR to -5BR Engine Conversion Program. Sep. 2005. pp. 1-4.
Allied Signal TFE731. Jane's Aero Engine Issue Five. Mar. 1999.
Pratt and Whitney PW1100G geared turbofan engine. The Flying Engineer. Retrieved Nov. 4, 2017 from: http://theflyingengineer.com/flightdeck/pw1100g-gtf/.
Product Brochure. BR710. Rolls-Royce. Copyright 2008. pp. 1-4.
Gunston, B. (1999). Pratt & Whitney PW6000. Jane's Aero Engine Issue Six. Sep. 1999.
Walsh, P.P. and Fletcher, P. (2004). Gas turbine performance, 2nd Edition. Oxford, UK: Blackwell Science. pp. 1-658.
ASME International Gas Turbine Institute. (Apr. 2013). Trends in the global energy supply and implications for the turbomachinery industry. Global Gas Turbine News, vol. 53(2). pp. 49-56.
Halle, J.E. and Michael, C.J. (1984). Energy efficient engine fan component detailed design report. NASA-CR-165466. pp. 1-135.

(56) References Cited

OTHER PUBLICATIONS

Fitzpatrick, G.A., Broughton, T. (1987). The Rolls-Royce wide chord fan blade. Rolls-Royce Reporting. Mar. 19, 1987. pp. 1-19.
Fitzpatrick, G.A. and Broughton, T. (1988). Diffusion bonding aeroengine components. Def Scie J vol. 38(4). Oct. 1998. pp. 477-485.
General Electric CF34. Jane's Aero-Engines. Jane's by IHS Markit. Jul. 26, 2010.
Pratt & Whitney PW8000. Jane's Aero-Engines. Jane's by IHS Markit. Sep. 30, 2010.
U.S. Department of Transportation: Federal Aviation Administration Type Certificate Data Sheet No. E00064EN. Dated: Nov. 24, 2006. p. 1-5.
Engine Alliance GP7200. Jane's Aero-Engines. Janes by IHS Markit. Jul. 12, 2010.
General Electric GE90. Jane's Aero-Engines. Jane's by IHS Markit. Nov. 1, 2010.
Pratt & Whitney PW2000. Janes Aero-Engines. Jane's by IHS Markit. Sep. 29, 2010.
Treager, I.E. (1995). Aircraft gas turbine engine technology, 3rd Edition. GLENCOE Aviation Technology Series. McGraw-Hill.
Pratt & Whitney PW6000. Janes Aero-Engines. Jane's by IHS Markit. Nov. 22, 2010.
United Technologies Pratt & Whitney. Jane's Aero-Engines. Jane's by IHS Markit. Aug. 30, 2000.
Product Brochure. The ALF 502R turbofan: technology, ecology, economy. Avco Lycoming TEXTRON.
Annex to the Notice un Article 94(3) EPC issued by the Examination Division. European Patent Application No. 13837107.5 mailed Jan. 25, 2019.
*Dr. Raymond G. Tronzo v. Biomet Inc.*, 156 F.3d 1154 (1998).
U.S. Appl. No. 61/494,453, filed Jun. 8, 2011 titled Geared Engine Flexible Mount Arrangement.

GEARED TURBOFAN ENGINE WITH POWER DENSITY RANGE

CROSS-REFERENCE TO RELATED APPLICATION

This application is a continuation of U.S. patent application Ser. No. 14/593,056, filed Jan. 9, 2015, which is a continuation-in-part of U.S. patent application Ser. No. 13/446,312, filed Apr. 13, 2012, which claims priority to U.S. Provisional Application No. 61/619,111, filed Apr. 2, 2012.

BACKGROUND OF THE INVENTION

This application relates to a geared turbofan gas turbine engine, wherein the low and high pressure spools rotate in the same direction relative to each other.

Gas turbine engines are known, and typically include a fan delivering air into a compressor section, and outwardly as bypass air to provide propulsion. The air in the compressor is delivered into a combustion section where it is mixed with fuel and burned. Products of this combustion pass downstream over turbine rotors, driving them to rotate. Typically there are low and high pressure compressors, and low and high pressure turbines.

The high pressure turbine typically drives the high pressure compressor as a high spool, and the low pressure turbine drives the low pressure compressor and the fan. Historically, the fan and low pressure compressor were driven at a common speed.

More recently, a gear reduction has been provided on the low pressure spool such that the fan and low pressure compressor can rotate at different speeds. It desirable to have more efficient engines that have more compact turbines to limit efficiency loses.

SUMMARY

In a featured embodiment, a gas turbine engine turbine comprises a high pressure turbine configured to rotate with a high pressure compressor as a high pressure spool in a first direction about a central axis. A low pressure turbine is configured to rotate with a low pressure compressor as a low pressure spool in the first direction about the central axis. A power density is greater than or equal to about 1.5 and less than or equal to about 5.5 lbf/in³. A fan is connected to the low pressure spool via a speed changing mechanism and will rotate in a second direction opposed to the first direction.

In another embodiment according to the previous embodiment, the power density is greater than or equal to about 2.0.

In another embodiment according to any of the previous embodiments, the power density is greater than or equal to about 4.0.

In another embodiment according to any of the previous embodiments, the power density thrust is calculated using a value that is sea level take-off, flat-rated static thrust.

In another embodiment according to any of the previous embodiments, guide vanes are positioned upstream of a first stage in the low pressure turbine to direct gases downstream of the high pressure turbine as they approach the low pressure turbine.

In another embodiment according to any of the previous embodiments, a mid-turbine frame supports the high pressure turbine.

In another embodiment according to any of the previous embodiments, the guide vanes are positioned intermediate the mid-turbine frame and the low pressure turbine.

In another embodiment according to any of the previous embodiments, the guide vanes are highly cambered such that the vanes direct products of combustion downstream of the high pressure turbine to be properly directed when initially encountering the first stage of the low pressure turbine.

In another embodiment according to any of the previous embodiments, the fan section delivers a portion of air into a bypass duct and a portion of the air into the low pressure compressor as core flow, and has a bypass ratio greater than 6.

In another embodiment according to any of the previous embodiments, the speed changing mechanism is a gear reduction.

In another embodiment according to any of the previous embodiments, a star gear is utilized to change the direction of rotation between the fan and the low pressure spool.

In another embodiment according to any of the previous embodiments, the star gear arrangement has a gear ratio above 2.3:1, meaning that the low pressure spool turns at least or equal to about 2.3 times as fast as the fan.

In another embodiment according to any of the previous embodiments, the speed changing mechanism is a gear reduction.

In another embodiment according to any of the previous embodiments, a star gear is utilized to change the direction of rotation between the fan and the low pressure spool.

In another embodiment according to any of the previous embodiments, the star gear arrangement has a gear ratio above 2.3:1, meaning that the low pressure spool turns at least or equal to about 2.3 times as fast as the fan.

In another featured embodiment, a gas turbine engine turbine comprises a high pressure turbine configured to rotate with a high pressure compressor as a high pressure spool in a first direction about a central axis. A low pressure turbine is configured to rotate in the first direction about the central axis. A power density is greater than or equal to about 4.0. A fan is connected to the low pressure turbine via a gear reduction and will rotate in a second direction opposed to the first direction.

In another embodiment according to the previous embodiment, the power density is a ratio of a thrust provided by the engine to a volume of a turbine section including both the high pressure turbine and the low pressure turbine. The thrust is sea level take-off, flat-rated static thrust.

In another embodiment according to any of the previous embodiments, the fan section delivers a portion of air into a bypass duct and a portion of the air into the low pressure compressor as core flow, and has a bypass ratio greater than 6.

In another embodiment according to any of the previous embodiments, a star gear is utilized to change the direction of rotation between the fan and the low pressure spool.

In another embodiment according to any of the previous embodiments, there is an intermediate turbine section, which drives a compressor rotor.

In another embodiment according to any of the previous embodiments, the gear reduction is positioned intermediate the fan and a compressor rotor driven by the low pressure turbine.

In another embodiment according to any of the previous embodiments, the gear reduction is positioned intermediate the low pressure turbine and a compressor rotor driven by the low pressure turbine.

These and other features may be best understood from the following drawings and specification.

DETAILED DESCRIPTION

Figure 1:
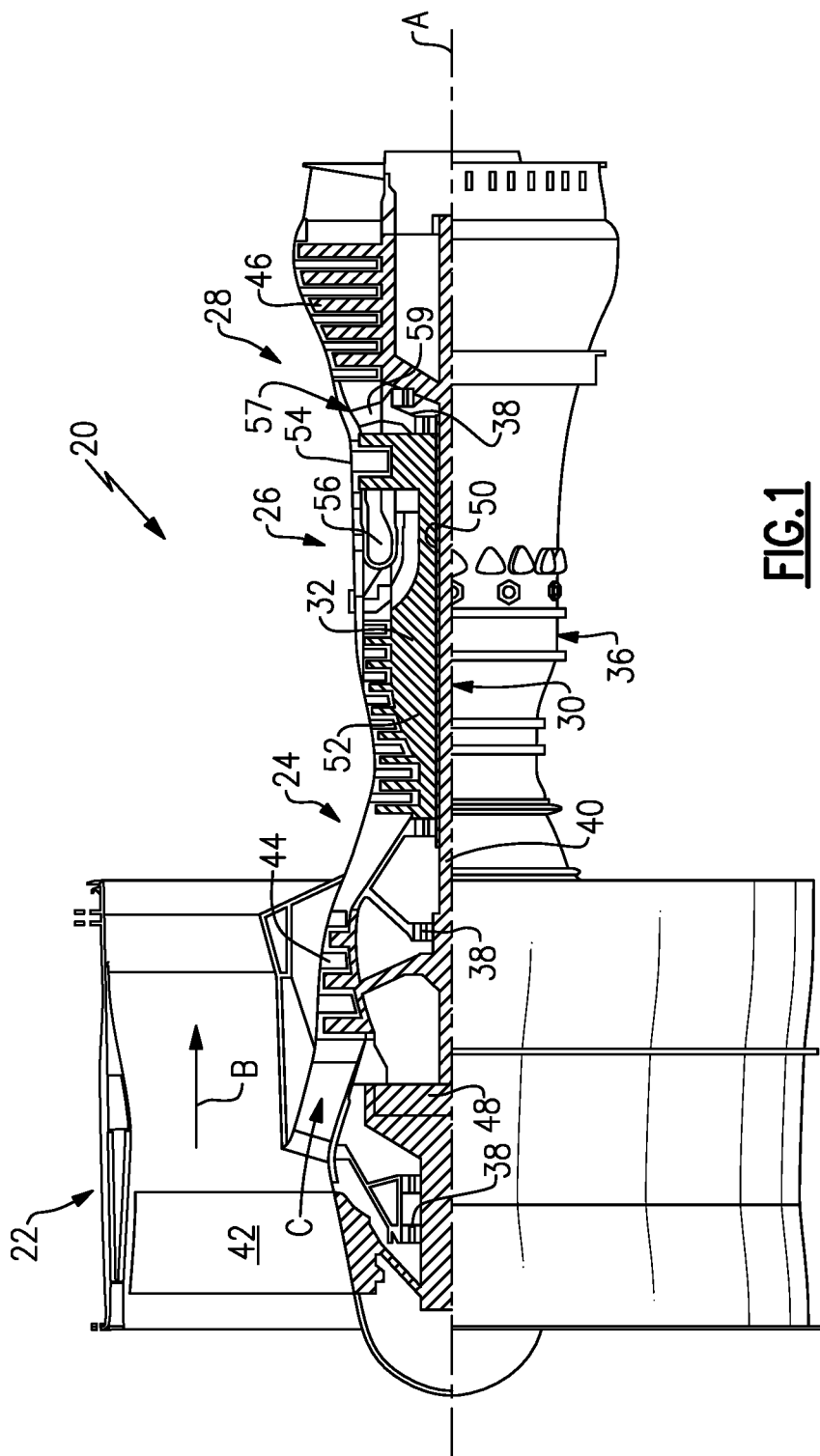
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include, for example, three-spools, an augmentor section, or a different arrangement of sections, among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines. For purposes of this application, the terms "low" and "high" as applied to speed or pressure are relative terms. The "high" speed and pressure would be higher than that associated with the "low" spools, compressors or turbines, however, the "low" speed and/or pressure may actually be "high."

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The terms "high" and "low" in relation to both the speed and pressure of the components are relative to each other, and not to an absolute value. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path and act as inlet stator vanes to turn the flow to properly feed the first blades of the low pressure turbine. The turbines 46, 54 rotationally drive the respective low speed spool 30 and high speed spool 32 in response to the expansion.

The engine 20 has bypass airflow B, and in one example is a high-bypass geared aircraft engine. The bypass ratio may be defined as the amount of air delivered into the bypass duct divided by the amount delivered into the core flow. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 and the low pressure turbine has a pressure ratio that is greater than about 5:1. Low pressure turbine 46 pressure ratio is the total pressure measured prior to inlet of low pressure turbine 46 as related to the pressure at the outlet of the low pressure turbine 46 prior to an exhaust nozzle. The geared architecture 48 may be a star gear arrangement such that the fan will rotate in a different direction than the low spool. It should be understood, however, that the above parameters are only exemplary of one embodiment of a geared architecture engine and that the present invention is applicable to other gas turbine engines including direct drive turbofans.

A greatest amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Low fan pressure ratio" is the pressure ratio across the fan blade alone, before the Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram deg R)/518.7)^0.5]. The "Low corrected fan tip speed" as disclosed herein according to one non-limiting embodiment is less than about 1150 ft/second at the same cruise point.

Figure 2:
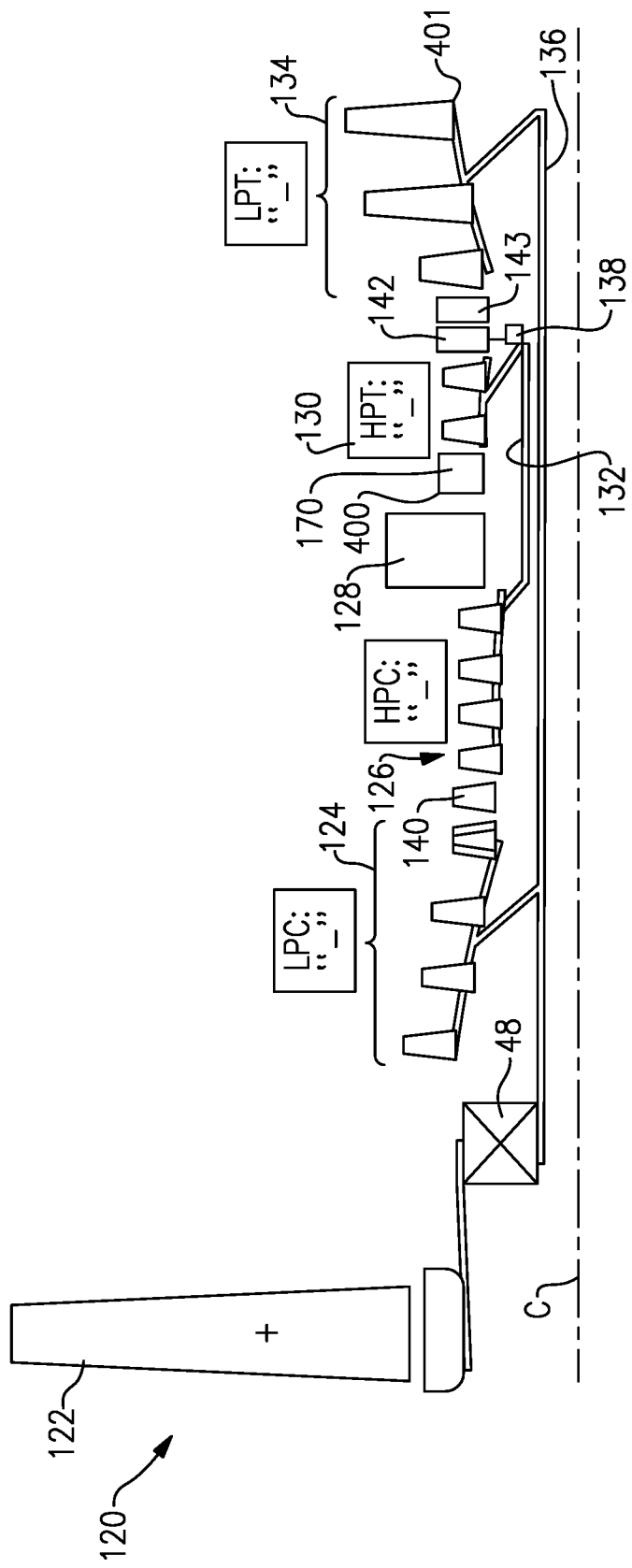
FIG. 2 schematically shows rotational features of one type of such an engine.

FIG. 2 shows detail of an engine 120, which may generally have the features of engine 20 of FIG. 1. A fan 122 is positioned upstream of a low pressure compressor 124, which is upstream of a high pressure compressor 126. A combustor 128 is positioned downstream of the high pressure compressor 126. A mid-turbine frame 142 may be positioned at a downstream end of the high pressure turbine 130, and supports a bearing 138, shown schematically, to support the aft end of the high pressure turbine 130, and a high pressure spool 132. A low pressure turbine 134 is positioned downstream of a mid-turbine frame 142. A low spool 136, driven by the low pressure turbine 134, drives the low pressure compressor 124. The speed change mechanism 48 causes the fan 122 to rotate at a different speed than the low pressure compressor 134. In embodiments of this invention, the speed input to output ratio for the speed change mechanism is above or equal to 2.3:1, and up to less than or equal to 13:1. The gear also causes fan 122 to rotate in an opposed direction relative to the low pressure compressor 124. As mentioned above, a star gear arrangement may be utilized to cause the fan 122 to rotate in the opposed direction ("+") relative to the low pressure compressor 124. In this embodiment the fan generally has less than 26 blades, and the low pressure turbine has at least three stages, and up to six stages. The high pressure turbine generally has one or two stages as shown.

In this particular embodiment, the low pressure compressor 124 and the low pressure turbine 134 rotate in one direction ("−") and the high pressure turbine 130, the high pressure compressor 126, rotate in the same direction ("−").

A strut 140 is shown between the low pressure compressor 124 and the high pressure compressor 126. The strut 140 spans the gas path, and has an airfoil shape, or at least a streamline shape. The combination of a blade at the exit of the low pressure compressor 124, the strut 140, and a variable vane, and then the first blade of the high pressure compressor 126 is generally encompassed within the structure illustrated as the strut 140.

Since the compressor sections 124 and 126 rotate in the same direction, the several airfoils illustrated as the element 140 are required to do less turning of the air flow.

As will be explained below, since the turbine section is provided with a highly cambered vane, there is less turning required between the two turbine sections. Since the compressor is forcing flow with an adverse pressure gradient, and whereas the turbine has a favorable pressure gradient, this overall engine architecture is benefited by the illustrated combination.

Highly cambered inlet guide vanes 143 are positioned in a location intermediate the mid-turbine frame 142 and the most upstream rotor in the low pressure turbine 134. The vanes 143 must properly direct the products of combustion downstream of the high pressure turbine 130 as they approach the first rotor of the low pressure turbine 134. It is desirable for reducing the overall size of the low pressure turbine that the flow be properly directed when it initially encounters the first stage of the low pressure turbine section.

The above features achieve a more compact turbine section volume relative to the prior art, including both the high and low pressure turbines. A range of materials can be selected. As one example, by varying the materials for forming the low pressure turbine, the volume can be reduced through the use of more expensive and more exotic engineered materials, or alternatively, lower priced materials can be utilized. In three exemplary embodiments the first rotating blade of the Low Pressure Turbine can be a directionally solidified casting blade, a single crystal casting blade or a hollow, internally cooled blade. All three embodiments will change the turbine volume to be dramatically smaller than the prior art by increasing low pressure turbine speed. In addition, high efficiency blade cooling may be utilized to further result in a more compact turbine section.

Due to the compact turbine section, a power density, which may be defined as thrust in pounds force produced divided by the volume of the entire turbine section, may be optimized. The volume of the turbine section may be defined by an inlet of a first turbine vane in the high pressure turbine to the exit of the last rotating airfoil in the low pressure turbine, and may be expressed in cubic inches. The static thrust at the engine's flat rated Sea Level Takeoff condition divided by a turbine section volume is defined as power density. The sea level take-off flat-rated static thrust may be defined in lbs force, while the volume may be the volume from the annular inlet of the first turbine vane in the high pressure turbine to the annular exit of the downstream end of the last rotor section in the low pressure turbine. The maximum thrust may be Sea Level Takeoff Thrust "SLTO thrust" which is commonly defined as the flat-rated static thrust produced by the turbofan at sea-level.

Figure 3:
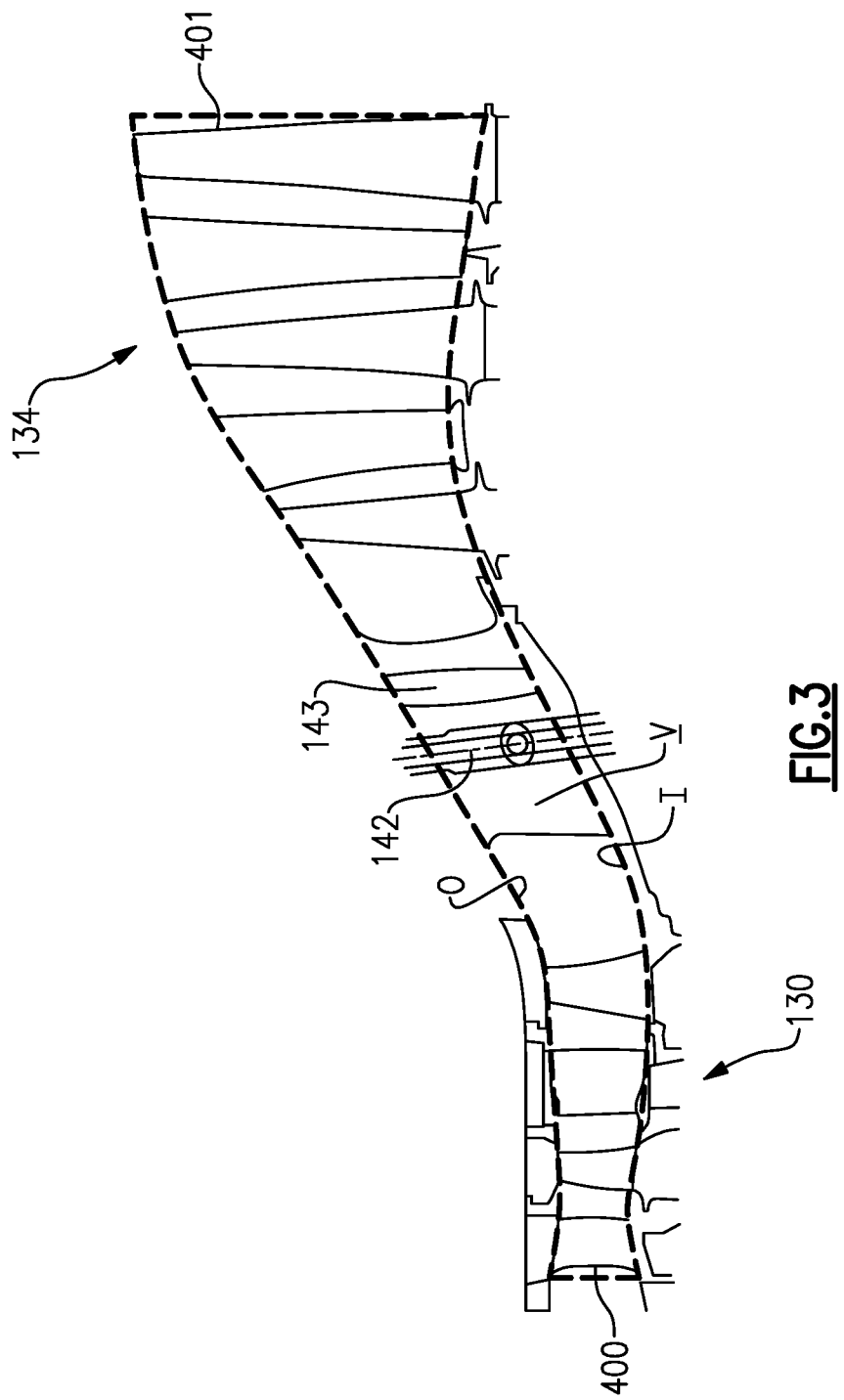
FIG. 3 is a detail of the turbine section volume.

The volume V of the turbine section may be best understood from FIG. 3. As shown, the frame 142 and vane 143 are intermediate the high pressure turbine section 130, and the low pressure turbine section 134. The volume V is illustrated by dashed line, and extends from an inner periphery I to an outer periphery O. The inner periphery is somewhat defined by the flowpath of the rotors, but also by the inner platform flow paths of vanes. The outer periphery is defined by the stator vanes and outer air seal structures along the flowpath. The volume extends from a most upstream end of the vane 400, typically its leading edge, and to the most downstream edge 401 of the last rotating airfoil in the low pressure turbine section 134. Typically this will be the trailing edge of that airfoil.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in$^3$) |
|---|---|---|---|
| 1 | 17,000 | 3,859 | 4.41 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.10 |
| 6 | 96,500 | 62,172 | 1.55 |
| 7 | 96,500 | 46,629 | 2.07 |
| 8 | 37,098 | 6,745 | 5.50 |

Thus, in embodiments, the power density would be greater than or equal to about 1.5 lbf/in$^3$. More narrowly, the power density would be greater than or equal to about 2.0 lbf/in$^3$.

Even more narrowly, the power density would be greater than or equal to about 3.0 lbf/in$^3$.

More narrowly, the power density is greater than or equal to about 4.0 lbf/in$^3$. More narrowly, the power density is greater than or equal to about 4.5 lbf/in$^3$. Even more narrowly, the power density is greater than or equal to about 4.75 lbf/in$^3$. Even more narrowly, the power density is greater than or equal to about 5.0 lbf/in$^3$.

Also, in embodiments, the power density is less than or equal to about 5.5 lbf/in$^3$.

While certain prior engines have had power densities greater than 1.5, and even greater than 3.2, such engines have been direct drive engines and not associated with a gear reduction. In particular, the power density of an engine known as PW4090 was about 1.92 lbf/in$^3$, while the power density of an engine known as V2500 had a power density of 3.27 lbf/in$^3$.

Engines made with the disclosed architecture, and including turbine sections as set forth in this application, and with modifications coming from the scope of the claims in this application, thus provide very high efficient operation, and increased fuel efficiency and lightweight relative to their trust capability.

Figure 4:
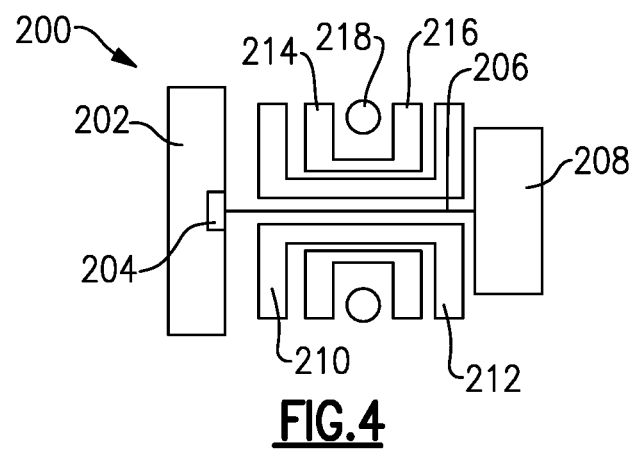
FIG. 4 shows another embodiment.

FIG. 4 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 5:
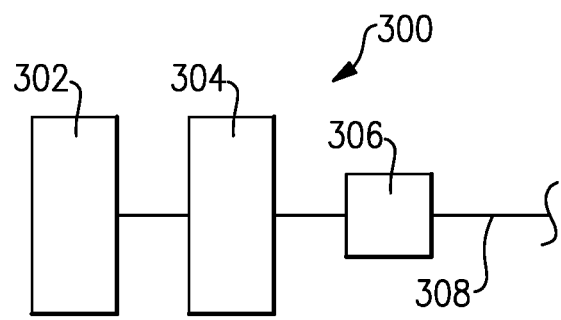
FIG. 5 shows yet another embodiment.

FIG. 5 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIG. 4 or 5 engines may be utilized with the density features disclosed above.

Although an embodiment of this invention has been disclosed, a person of ordinary skill in this art would recognize that certain modifications would come within the scope of this application. For that reason, the following claims should be studied to determine the true scope and content of this invention.

What is claimed is:

1. A gas turbine engine comprising:
a compressor section including a low pressure compressor and a high pressure compressor;
a turbine section including a low pressure turbine and a high pressure turbine, the high pressure turbine rotatable with the high pressure compressor as a high pressure spool in a first direction about an engine longitudinal axis, and the low pressure turbine rotatable as a low pressure spool in the first direction about the engine longitudinal axis;
a power density of greater than or equal to 4.75 and less than or equal to 5.5 lbf/in$^3$, wherein the power density is a ratio of a thrust provided by the engine to a volume of the turbine section, and the thrust is sea level take-off, flat-rated static thrust;
a fan section including a fan having a plurality of fan blades and an outer housing surrounding the fan to define a bypass duct, wherein the fan is connected to the low pressure spool via a geared architecture such that the fan is rotatable about the engine longitudinal axis in a second direction opposed to the first direction; and
wherein the fan section delivers a portion of air into the compressor section, and a portion of air into the bypass duct, and a bypass ratio, which is defined as a volume of air passing to the bypass duct compared to a volume of air passing into the compressor section, is greater than 6.

2. The gas turbine engine as recited in claim 1, wherein a compressor rotor of the compressor section is driven by the low pressure turbine through the geared architecture.

3. The gas turbine engine as recited in claim 2, wherein the power density is greater than or equal to 5.0 and less than or equal to 5.5 lbf/in$^3$, the bypass ratio is greater than 10, and the fan has a low fan pressure ratio of less than 1.45 across the fan blade alone.

4. The gas turbine engine as recited in claim 1, wherein the low pressure turbine is rotatable with the low pressure compressor as the low pressure spool in the first direction.

5. The gas turbine engine as recited in claim 4, wherein the fan has a low fan pressure ratio of less than 1.45 across the fan blade alone.

6. The gas turbine engine as recited in claim 5, wherein the low pressure turbine includes an inlet, an outlet and a pressure ratio of greater than 5, the pressure ratio being pressure measured prior to the inlet as related to pressure at the outlet prior to an exhaust nozzle.

7. The gas turbine engine as recited in claim 6, wherein the bypass ratio is greater than 10, and a gear ratio of the geared architecture is greater than 2.3.

8. The gas turbine engine as recited in claim 7, wherein a low corrected fan tip speed of the fan blades is less than 1150 feet per second at a cruise point.

9. The gas turbine engine as recited in claim 8, wherein the low pressure turbine includes three stages, but no more than six stages.

10. The gas turbine engine as recited in claim 9, wherein the high pressure turbine includes two stages, and the low pressure compressor includes three stages.

11. The gas turbine engine as recited in claim 10, wherein the turbine section includes a mid-turbine frame arranged between the high pressure turbine and the low pressure turbine with respect to the engine longitudinal axis.

12. The gas turbine engine as recited in claim 4, wherein the low pressure turbine includes three stages.

13. The gas turbine engine as recited in claim 12, wherein the bypass ratio is greater than 10, the fan has 26 or fewer fan blades, and a low corrected fan tip speed of the fan blades is less than 1150 feet per second at a cruise point.

14. The gas turbine engine as recited in claim 13, wherein the low pressure turbine includes no more than six stages, and the high pressure turbine includes two stages.

15. The gas turbine engine as recited in claim 14, wherein the high pressure compressor includes four stages.

16. The gas turbine engine as recited in claim 15, wherein the fan has a low fan pressure ratio of less than 1.45 across the fan blade alone.

17. The gas turbine engine as recited in claim 16, wherein a volume of the turbine section is between 3,859 and 6,745 in$^3$.

18. The gas turbine engine as recited in claim 16, wherein the low pressure compressor includes three stages.

19. The gas turbine engine as recited in claim 18, wherein the low pressure turbine includes an inlet, an outlet and a pressure ratio of greater than 5, the pressure ratio being pressure measured prior to the inlet as related to pressure at the outlet prior to an exhaust nozzle.

20. The gas turbine engine as recited in claim 19, wherein a gear ratio of the geared architecture is greater than 2.3.

21. The gas turbine engine as recited in claim 20, wherein the turbine section includes a mid-turbine frame arranged between the high pressure turbine and the low pressure turbine with respect to the engine longitudinal axis, and the mid-turbine frame supports a bearing arranged to support the high pressure turbine.

22. The gas turbine engine as recited in claim 21, wherein the power density is greater than or equal to 5.0 and less than or equal to 5.5 lbf/in$^3$.

23. The gas turbine engine as recited in claim 21, wherein a volume of the turbine section is between 3,859 and 6,745 in$^3$.

24. The gas turbine engine as recited in claim 23, wherein the high pressure compressor includes eight stages.

25. The gas turbine engine as recited in claim 24, wherein the power density is greater than or equal to 5.0 and less than or equal to 5.5 lbf/in$^3$.

26. The gas turbine engine as recited in claim 23, further comprising inlet guide vanes positioned intermediate the mid-turbine frame and a most upstream rotor in the low pressure turbine to direct gases downstream of the high pressure turbine as the gases approach the low pressure turbine.

27. The gas turbine engine as recited in claim 26, wherein the high pressure compressor includes eight stages.

28. The gas turbine engine as recited in claim 27, wherein the low pressure turbine is a three stage turbine.

29. The gas turbine engine as recited in claim 28, wherein the power density is greater than or equal to 5.0 and less than or equal to 5.5 lbf/in$^3$.

30. The gas turbine engine as recited in claim 29, wherein the guide vanes are highly cambered such that the vanes direct products of combustion downstream of the high pressure turbine to be properly directed when initially encountering the first stage of the low pressure turbine.

31. The gas turbine engine as recited in claim 14, wherein the geared architecture includes an epicyclic gear train, and wherein the power density is greater than or equal to 4.84 and less than or equal to 5.5 lbf/in$^3$.

32. The gas turbine engine as recited in claim 21, further comprising inlet guide vanes positioned intermediate the mid-turbine frame and a most upstream rotor in the low pressure turbine to direct gases downstream of the high pressure turbine as the gases approach the low pressure turbine, wherein the power density is greater than or equal to 4.84 and less than or equal to 5.5 lbf/in$^3$, and wherein the geared architecture includes an epicyclic gear train.

\* \* \* \* \*